United States Patent Office 2,834,693
Patented May 13, 1958

---

2,834,693

VINYL SILANE COMPOSITION AND PROCESS FOR TREATING FIBROUS GLASS MATERIAL THEREWITH

Maurice H. Jellinek, Kenmore, N. Y., assignor to Union Carbide Corporation, a corporation of New York No Drawing. Application March 27, 1953
Serial No. 345,263

17 Claims. (Cl. 117—126)

This invention relates to the treatment of fibrous glass material such as, for instance, is employed in making composite products from resins and glass cloth. More particularly, it is concerned with an improved process for sizing or finishing fibrous glass material with a monomeric vinylalkoxysilane.

The production of glass fabric-reinforced or glass fiber-filled plastic sheets, commonly referred to as "laminates," has becomes a major industry in recent years. The laminates which are currently of interest are glass cloth-polyester resin compositions that are finding widespread use in aircraft construction, both structurally and functionally because of its high strength to weight ratio. Still other uses are in boat hulls, automobile bodies, bathtubs, fishing rods, and the like. One of the major problems encountered in the production of such laminates is that of obtaining a high quality composition with respect to the strength and permanence of the bonding of the resin to the glass, especially under conditions of high humidity or in contact with water.

Laminates in which the strength is dependent upon mechanical bond alone have been found quite satisfactory in applications where exposure to water or high humidity is not encountered, but upon exposure to water or high humidity the loss in strength may run as high as 50 to 60 percent.

The use of organic silicon compounds to provide continuity and bonding between glass and polyester resins has been suggested, by reason of the combination of organic and inorganic chemical groups present therein, but each of the processes heretofore proposed has been attended by objectionable or undesirable features. The condensation of vinyltrichlorosilane on glass fibers releases hydrogen chloride which is objectionable because it is corrosive. Similarly, the application of siloxanes in flammable or toxic solvents presents hazards to health and property by way of fire, explosion and poisoning. Other organic silicon compounds that have been suggested for the treatment of glass cloth include allyl silanes (U. S. Patent 2,563,288). Certain of these prior processes employ relatively high temperatures—temperatures as high as 275° C.—for curing the organic silane compounds, requiring special oven equipment not commonly employed in the industry, as well as requiring flammable solvents for the sizing step, while others employ compounds that are rare and very costly.

The present improvement is based on my discovery that reinforced plastics such as laminates having a superior glass to resin bond are produced by subjecting the glass cloth, prior to lamination, to a treatment with vinyltriethoxysilane dissolved in a non-flammable solvent additionally containing a small amount of alkaline material as catalyst. The treatment can be carried out, quite simply, by immersing the glass cloth in the non-flammable solution of vinyltriethoxysilane, and then heating it to cure the silicon compound, after first removing the excess solvent. The non-flammable solvent which is predominantly water can be any aqueous organic admixture in which the organic constituent is a solvent for, but non-reactive with, the vinyltriethoxysilane and miscible with sufficient water as to provide a homogeneous non-flammable mixture therewith. Aqueous ethanol containing about 25 parts of ethanol per 75 parts of water is preferred. However, where open equipment is used, a less volatile organic solvent such as methoxyethanol or ethoxyethanol can be employed to good advantage.

The amount of vinyltriethoxysilane present in the sizing bath is not narrowly critical. From about 0.6 part per 100 parts of aqueous ethanol or other non-flammable solvent up to the upper limit of solubility of this silicon compound have been employed with good results. At concentrations below 0.6 part, the amount of vinyltriethoxysilane picked up by the glass fibers begins to become insufficient to be effective, and a succession of treatments may be required; whereas on the side of higher concentration no commensurate advantage is obtained by exceeding the solubility limit of the vinyltriethoxysilane in the solvent system. An amount which is one part per 100 parts of solvent is preferred.

An esential feature of the improvement is the presence in the treating bath, as catalyst, of alkaline material such that the bath will have a pH from 8 to 11. At a pH value less than 8, inferior laminates result unless special precautions are taken. These special precautions include, among other things, an extended induction period up to as long as 24 hours after mixing of the treatment bath before it can be used. At a pH above 11, on the other hand, the tendency is for the wet strength and eventually the dry strength of the laminate to decrease. As catalyst, the following alkaline materials can be used: the alkaline metal hydroxides, lithium, sodium and potassium hydroxides; alkaline earth metal hydroxides, especially calcium hydroxide; ammonia, ammonium hydroxide; amines, including alkanol amines; and the like. Of these, sodium hydroxide is preferred, and in an amount which is about 0.02 part per 100 parts of solvent is preferred.

As organic solvents for the vinyltriethoxysilane, the following are representative of those that can be employed in admixture with water: methanol, ethanol, isopropanol, methoxyethanol, ethoxyethanol, acetone, methylethyl ketone, and the like. Preferably, the vinyltriethoxysilane is dissolved in the organic solvent and the solution diluted with water. The catalyst may be added before or after dilution.

Without wishing to be bound by any particular theory, one possible explanation of the role played by the catalyst is that it serves to catalyze the hydrolysis of vinyltriethoxysilane and the replacement of the ethoxy groups thereof with hydroxyl groups. The hydrolyzed product may then condense with itself and with the glass during drying and curing. In accord with well established principles, the speed of hydrolysis of the vinyltriethoxysilane would be expected to be dependent upon the alkalinity of the catalyst and its concentration.

In carrying out my process, the glass cloth or other material is saturated with the treating solution, as by immersion in a bath, in order that the silicon compound will be picked up by the fiber. After removal of the glass fiber material from the bath, the excess solvent is removed by known expedients such as by air-drying. Thereafter, the treated material is heated to cure the size. For this purpose, a temperature of about 125° C. is preferred, but higher or lower temperatures can be employed if desired. In general, the higher the temperature, the shorter the heating period. Temperatures below 70° C. will usually be found to require too long a curing period for practical purposes. Temperatures as high as 275° C. can be employed, but for only a very short curing period. Ordinarily a temperature above 175° C. will be found to be unnecessary. Thereafter, laminates or other reinforced plastic products can be made from the sized cloth using known procedures and standard techniques.

The following examples are illustrative.

EXAMPLE 1

Glass cloth which had previously been subjected to heat cleaning was immersed in a solution containing one part of vinyltriethoxysilane ($CH_2CH(C_2H_5O)_3Si$) and 0.05 part of sodium hydroxide (NaOH) in 100 parts of aqueous ethanol (25 parts ethanol), all by weight. The pH of the treating bath was 10.7. The cloth picked up about one-half of its own weight of solution, about 50 to 55 parts per 100 parts by weight of the cloth; and after evaporation of the solvent there remained on the cloth an amount of silicon compound corresponding to one-half part of vinyltriethoxysilane per 100 parts of cloth. After the cloth had been air-dried at room temperature, it was heated at a temperature of 125° C. for a period of 20 minutes to cure the silicon compound.

Laminates were prepared from this treated cloth by laying up alternate layers of the treated glass cloth and a commercial polyester laminating resin ("Selectron 5003" polyester resin, Varnish Division of Pittsburgh Plate Glass Co.) in accord with customary practice. An excess of the polyester resin was placed between the layers and then some of the excess was squeezed out by pressing the laminate with a spatula. The laminates thus laid up were placed in a hydraulic press provided with steam-heated platens and subjected under pressure first to a pre-curing treatment at a temperature of about 50° C. to 70° C. for a period of 5 to 15 minutes and thereafter to a final curing temperature of 120° C. for at least twenty minutes. A sufficient number of plies was used to produce laminates about 0.105 inch thick. To aid in obtaining laminates of 0.105 inch thickness for comparative tests, spacers were employed to maintain platen separation.

The laminates were evaluated by carrying out tests of flexural strength on specimens cut from the material, three tests being made on the material as cured, and three on specimens that were subjected to boiling tap water for a period of two hours, cooled to room temperature in water, and then tested wet. The flexural tests were carried out as described in Air Force Specification MILP-8013 (also Federal Specification LP-406a Method No. 1031). A specimen, 4 inch by 1 inch, is placed on standardized supports, 2 inches apart, and the specimen then broken by a load applied midway between these two supports.

The results of the tests were as follows:

*Flexural strength*

| Specimen: | Pounds per square inch |
|---|---|
| 1, dry | 69,000 |
| 2, dry | 71,000 |
| 3, dry | [1] 66,000 |
| 4, wet | 65,000 |
| 5, wet | 64,000 |
| 6, wet | [2] 65,000 |

[1] Average 69,000 dry.
[2] Average 65,000 wet.

The retention, which is defined as the ratio of wet strength to the dry strength, was 94 percent.

EXAMPLE 2

Glass cloth, heat-cleaned as in Example 1, was immersed in a solution containing one part of vinyl triethoxysilane and 0.02 part of sodium hydroxide in 100 parts of a solvent consisting of water, 75 parts; ethanol, 2 parts; and methoxyethanol, 22 parts; all by weight. The pH of the treating bath was 10.4. The cloth picked up about one-half its weight of solution (50 parts per 100 parts of glass cloth). The treated cloth was air-dried and then heated at a temperature of 125° C. for a period of twenty minutes to cure the silicon compound finish. The amount of finish remaining on the glass cloth after drying corresponded to about 0.5 part of vinyltriethoxysilane per 100 parts of cloth.

Laminates were then made as in Example 1 and evaluated with the following results.

*Flexural strength*

| Specimen: | Pounds per square inch |
|---|---|
| 1, dry | 73,000 |
| 2, dry | 69,000 |
| 3, dry | [1] 72,000 |
| 4, wet | 66,000 |
| 5, wet | 63,000 |
| 6, wet | [2] 63,000 |

[1] Average 71,000 dry.
[2] Average 64,000 wet.

The ratio of wet strength to dry strength (retention) was 90 percent.

EXAMPLE 3

Another run was carried out as described in Example 1 except that the sodium hydroxide content of the aqueous ethanol bath was reduced to 0.02 part per 100 parts of solvent. The pH of the treating bath was 10.4.

The laminate was evaluated with the following results.

*Flexural strength*

| Specimen: | Pounds per square inch |
|---|---|
| 1, dry | 76,000 |
| 2, dry | 81,000 |
| 3, dry | [1] 77,000 |
| 4, wet | 76,000 |
| 5, wet | 75,000 |
| 6, wet | [2] 74,000 |

[1] Average 78,000 dry.
[2] Average 75,000 wet.

The retention (wet strength/dry strength) was 96 percent.

EXAMPLE 4

A number of runs were made as described in Example 1, excepting that a number of different catalysts and catalyst concentrations were employed. The catalysts employed were triethanolamine at concentrations of 0.38 and 0.05 part; and sodium hydroxide at 0.05, 0.0067 and 0.0033 part, all per 100 parts of solvent.

The laminates were evaluted with the following results which are the average of three specimens in each instance.

| Catalyst | Conc./100 parts solvent | pH | Flexural Strength in pounds per square inch | | Retention |
|---|---|---|---|---|---|
| | | | Dry | Wet | |
| triethanolamine [1] | 0.38 | 9.3 | 70 | 57 | 83 |
| Do [1] | 0.05 | 8.8 | 72 | 54 | 75 |
| sodium hydroxide [1] | 0.05 | 10.7 | 72 | 65 | 90 |
| Do | 0.0067 | 9.7 | 67 | 62 | 93 |
| Do | 0.0033 | 9.5 | 65 | 52 | 80 |

[1] The treating solution was allowed to stand six hours before use.

What is claimed is:

1. In a process for treating fibrous glass material with a vinyl silicon compound prior to the formation of composite products therefrom in combination with polyester resin, the improvement which comprises applying such vinyl silicon compound to said glass material from a non-flammable aqueous solution, said solution containing at least 0.6 part of vinyltriethoxysilane per 100 parts of solvent and a small catalytic amount of alkaline reacting material such as to provide a pH of about 8 to 11 in said solution, said solvent being predominantly water in admixture with a water-miscible organic solvent for said vinyltriethoxysilane and non-reactive therewith; and thereafter heating said treated glass fibrous material to cure the vinyl silicon compound deposited on said fibrous glass material.

2. In a process for treating fibrous glass material with a vinyl silicon compound prior to the formation of composite products therefrom in combination with polyester resin, the improvement which comprises applying such vinyl silicon compound to said glass material from a non-flammable aqueous solution, said solution containing at least 0.6 part of vinyltriethoxysilane per 100 parts of solvent and a small catalytic amount of alkaline reacting material such as to provide a pH of about 8 to 11 in said solution, said solvent being predominantly water in admixture with a water-miscible organic solvent for said vinyltriethoxysilane and non-reactive therewith; and thereafter heating said treated glass fibrous material to a temperature of about 70° C. to 175° C. to cure the vinyl silicon compound deposited on said fibrous glass material.

3. In a process for treating fibrous glass material with a vinyl silicon compound prior to the formation of composite products therefrom in combination with polyester resin, the improvement which comprises applying such vinyl silicon compound to said glass material from a non-flammable aqueous solution, said solution containing at least 0.6 part of vinyltriethoxysilane per 100 parts of solvent and a small catalytic amount of alkaline reacting material such as to provide a pH of about 8 to 11 in said solution, said solvent being predominantly water in admixture with a water-miscible organic solvent for said vinyltriethoxysilane and non-reactive therewith; and thereafter heating said treated glass fibrous material to a temperature of about 125° C. to cure the vinyl silicon compound deposited on said fibrous glass material.

4. In a process for treating fibrous glass material with a vinyl silicon compound prior to the formation of composite products therefrom in combination with polyester resin, the improvement which comprises applying such vinyl silicon compound to said glass material from a non-flammable aqueous solution, said solution containing at least 0.6 part of vinyltriethoxysilane per 100 parts of solvent and a small catalytic amount of alkali metal hydroxide such as to provide a pH of about 8 to 11 in said solution, said solvent being predominantly water in admixture with a water-miscible organic solvent for said vinyltriethoxysilane and non-reactive therewith; and thereafter heating said treated glass fibrous material to cure the vinyl silicon compound deposited on said fibrous glass material.

5. In a process for treating fibrous glass material with a vinyl silicon compound prior to the formation of composite products therefrom in combination with polyester resin, the improvement which comprises applying such vinyl silicon compound to said glass material from a non-flammable aqueous solution, said solution containing at least 0.6 part of vinyltriethoxysilane per 100 parts of solvent and a small catalytic amount of alkali metal hydroxide such as to provide a pH of about 8 to 11 in said solution, said solvent being predominantly water in admixture with a water-miscible organic solvent for said vinyltriethoxysilane and non-reactive therewith; and thereafter heating said treated glass fibrous material to a temperature of about 70° C. to 175° C. to cure the vinyl silicon compound deposited on said fibrous glass material.

6. In a process for treating fibrous glass material with a vinyl silicon compound prior to the formation of composite products therefrom in combination with polyester resin, the improvement which comprises applying such vinyl silicon compound to said glass material from a non-flammable aqueous solution, said solution containing at least 0.6 part of vinyltriethoxysilane per 100 parts of solvent and a small catalytic amount of alkali metal hydroxide such as to provide a pH of about 8 to 11 in said solution, said solvent being predominantly water in admixture with a water-miscible organic solvent for said vinyltriethoxysilane and non-reactive therewith; and thereafter heating said treated glass fibrous material to a temperature of about 125° C. to cure the vinyl silicon compound deposited on said fibrous glass material.

7. In a process for treating fibrous glass material with a vinyl silicon compound prior to the formation of composite products therefrom in combination with polyester resin, the improvement which comprises applying such vinyl silicon compound to said glass material from a non-flammable aqueous solution, said solution containing at least 0.6 part of vinyltriethoxysilane per 100 parts of solvent and a small catalytic amount of alkaline reacting material such as to provide a pH of about 8 to 11 in said solution, said solvent being predominantly water in admixture with an alcohol miscible with water and a solvent for said vinyltriethoxysilane and non-reactive therewith; and thereafter heating said treated glass fibrous material to cure the vinyl silicon compound deposited on said fibrous glass material.

8. In a process for treating fibrous glass material with a vinyl silicon compound prior to the formation of composite products therefrom in combination with polyester resin, the improvement which comprises applying such vinyl silicon compound to said glass material from a non-flammable aqueous solution, said solution containing at least 0.6 part of vinyltriethoxysilane per 100 parts of solvent and a small catalytic amount of alkaline reacting material such as to provide a pH of about 8 to 11 in said solution, said solvent being predominantly water in admixture with ethoxyethanol miscible with water and a solvent for said vinyltriethoxysilane and non-reactive therewith; and thereafter heating said treated glass fibrous material to cure the vinyl silicon compound deposited on said fibrous glass material.

9. In a process for treating fibrous glass material with a vinyl silicon compound prior to the formation of composite products therefrom in combination with polyester resin, the improvement which comprises applying such vinyl silicon compound to said glass material from a non-flammable aqueous solution, said solution containing at least 0.6 part of vinyltriethoxysilane per 100 parts of solvent and a small catalytic amount of alkaline reacting material such as to provide a pH of about 8 to 11 in said solution, said solvent being predominantly water in admixture with ethanol miscible with water and a solvent for said vinyltriethoxysilane and non-reactive therewith; and thereafter heating said treated glass fibrous material to cure the vinyl silicon compound deposited on said fibrous glass material.

10. In a process for treating fibrous glass material with a vinyl silicon compound prior to the formation of composite products therefrom in combination with polyester resin, the improvement which comprises applying such vinyl silicon compound to said glass material from a non-flammable aqueous solution, said solution containing at least 0.6 part of vinyltriethoxysilane per 100 parts of solvent and a small catalytic amount of alkaline reacting material such as to provide a pH of about 8 to 11 in said solution, said solvent being predominantly water in admixture with methoxyethanol miscible with water and a solvent for said vinyltriethoxysilane and non-reactive therewith; and thereafter heating said treated glass fibrous material to cure the vinyl silicon compound deposited on said fibrous glass material.

11. A composition for treating fibrous glass materials prior to the formation of composite products therefrom in combination with polyester resin, said composition comprising a non-flammable aqueous organic solvent containing at least 0.6 part of vinyltriethoxysilane per 100 parts of said solvent and a small catalytic amount of an alkaline reacting material such as to provide a pH of 8 to 11 in said solution; said solvent being predominantly water in admixture with a water-miscible organic solvent for vinyltriethoxysilane and non-reactive therewith.

12. A composition for treating fibrous glass materials prior to the formation of composite products therefrom in combination with polyester resin, said composition comprising a non-flammable aqueous organic solvent containing at least 0.6 part of vinyltriethoxysilane per 100 parts of said solvent and a small catalytic amount of an alkali metal hydroxide such as to provide a pH of 8 to 11 in said solution; said solvent being predominantly water in admixture with a water-miscible organic solvent for vinyltriethoxysilane and non-reactive therewith.

13. A composition for treating fibrous glass materials piror to the formation of composite products therefrom in combination with polyester resin, said composition comprising a non-flammable aqueous organic solvent containing at least 0.6 part of vinyltriethoxysilane per 100 parts of said solvent and a small catalytic amount of an alkaline reacting material such as to provide a pH of 8 to 11 in said solution; said solvent being predominantly water in admixture with an alcohol miscible with water and a solvent for vinyltriethoxysilane and non-reactive therewith.

14. A composition for treating fibrous glass materials prior to the formation of composite products therefrom in combination with polyester resin, said composition comprising a non-flammable aqueous organic solvent containing at least 0.6 part of vinyltriethoxysilane per 100 parts of said solvent and a small catalytic amount of an alkaline reacting material such as to provide a pH of 8 to 11 in said solution; said solvent being predominantly water in admixture with ethanol.

15. A composition for treating fibrous glass materials prior to the formation of composite products therefrom in combination with polyester resin, said composition comprising a non-flammable aqueous organic solvent containing at least 0.6 part of vinyltriethoxysilane per 100 parts of said solvent and a small catalytic amount of an alkaline reacting material such as to provide a pH of 8 to 11 in said solution; said solvent being predominantly water in admixture with methoxyethanol.

16. A composition for treating fibrous glass materials prior to the formation of composite products therefrom in combination with polyester resin, said composition comprising a non-flammable aqueous organic solvent containing at least 0.6 part of vinyltriethoxysilane per 100 parts of said solvent and a small catalytic amount of an alkaline reacting material such as to provide a pH of 8 to 11 in said solution; said solvent being predominantly water in admixture with ethoxyethanol.

17. The method which comprises coating the surface of clean glass with a solution of vinyltriethoxysilane and ammonium hydroxide in a solvent medium composed of water and a water-miscible organic solvent and heating the coated glass to evaporate said solvent and the ammonium hydroxide.

References Cited in the file of this patent

UNITED STATES PATENTS

| | | |
|---|---|---|
| 2,532,583 | Tyran | Dec. 5, 1950 |
| 2,563,288 | Steinman | Aug. 7, 1951 |

OTHER REFERENCES

Jellinek: Modern Plastics, vol. 30, No. 3, November 1952.